United States Patent
Kikuchi et al.

[15] 3,698,298
[45] Oct. 17, 1972

[54] FLASH PHOTOGRAPHIC DEVICE FOR AUTOMATIC EXPOSURE CONTROL CAMERAS

[72] Inventors: Tomio Kikuchi; Hiroshi Yamaguchi, both of Tokorozawa; Kiyoyuki Arai, Gyoda, all of Japan

[73] Assignee: Kabushiki Kaisha, Koparu, Japan

[22] Filed: March 12, 1970

[21] Appl. No.: 19,047

[30] Foreign Application Priority Data

March 14, 1969 Japan ..................... 44/19381

[52] U.S. Cl .............................. 95/10 CE, 95/11.5
[51] Int. Cl .............................................. G01j 1/44
[58] Field of Search...95/10 C, 11.5, 10 CE; 315/156

[56] References Cited

UNITED STATES PATENTS

| | | | |
|---|---|---|---|
| 3,528,350 | 9/1970 | Schmitt | 95/10 CE |
| 3,575,096 | 4/1971 | Ernisse | 95/10 CE |
| 3,450,939 | 6/1969 | Misencik | 315/156 |
| 3,282,179 | 11/1966 | Stimson | 95/10 C |
| 3,470,798 | 10/1969 | Miyakawa | 95/10 C |
| 3,440,938 | 4/1969 | Stimson | 95/10 C |

*Primary Examiner*—Samuel S. Matthews
*Assistant Examiner*—Russell E. Adams, Jr.
*Attorney*—Otto John Munz

[57] ABSTRACT

A camera equipped with an electronic shutter operative so that the intensity of the scene illumination is detected by a photoconductive cell and that the electronic automatic exposure control circuit containing said photoconductive cell is actuated in accordance with the amount of illumination thus detected and that, as a result, the electromagnet connected to said circuit is caused to effectuate the action of closing the shutter blades. An illuminant is provided opposite to said photoconductive cell so that, in case flash photograph is taken, said illuminant is lighted in the stage of the release of the shutter mechanism of the camera. Therefore, prior to being subjected to the reflected light from the scene illuminated by a flash bulb, the photoconductive cell is preliminarily exposed directly to the irradiation from the illuminant.

8 Claims, 12 Drawing Figures

FLASH PHOTOGRAPHIC DEVICE FOR AUTOMATIC EXPOSURE CONTROL CAMERAS

BACKGROUND OF THE INVENTION

1. Field of the Invention

The present invention is concerned with a flash photographic device for cameras equipped with an electronic shutter, and more particularly, it relates to a flash photographic device for a camera having an electronic shutter and being operative so that the intensity of illumination of the scene to be photographed is detected by a photoconductive cell and that the moment of time of closing the shutter blades is controlled in accordance with the amount of the illumination thus detected, in which the photoconductive cell is adapted to be preliminarily irradiated by the light from an illuminant before the flash bulb is lighted up and then this photoconductive cell is subjected to the reflected light coming from the scene to be photographed upon the latter's being illuminated by the flash of light coming from the luminescing flash bulb.

2. Description of the prior art

In case a camera equipped with an electronic shutter whose action is controlled by an electronic automatic exposure control circuit is used for the purpose of performing flash photography, the functional properties of such a camera having the electronic shutter will be manifested sufficiently to obtain a quite effective result of this photography only if said control circuit is able to operate so that the proper control of the electronic shutter is effected thereby in accordance with the intensity of light reflected from the scene which is illuminated by the flash light from the luminescing flash bulb.

In case, however, a camera equipped with a conventional electronic shutter is used, without any modification or improvement, for the purpose of a flash photography, the electronic automatic exposure control circuit contained in the electronic shutter mechanism will not be able to perform the desired proper control of the electronic shutter. Because, the photoconductive cell, such as CdS, which is employed in general in said control circuit for the detection of the intensity of the illumination of the scene to be photographed has the drawback that it is poor in the speed of its response to the incident light, in contrast to its superior properties, i.e., the relative visibility characteristic, the reliability lasting for a prolonged period of time and the sensitivity to incident light rays. It is to be noted, furthermore, that flash photography tends to be conducted in circumstances, in most cases, of a low intensity of illumination of the scene to be photographed. As a result, there arises the inconveniences that the photoconductive cell is not able to effect proper response to the light from the scene illuminated by the flash bulb, and that the aforesaid control circuit, in turn, is unable to perform proper control of the electronic shutter. In case of a flash photography which is conducted under such a circumstance, the resulting photograph will present an over-exposure condition. In case a flash photography is performed under a circumstance in which the scene is illuminated at a still lower intensity, there arises an even greater inconvenience in that the photoconductive cell is practically unable to respond to the flash of light and that the shutter blades are retained continuously in the state of being open.

In order to solve the foregoing problems, there have been taken the following counter-measures in the past. That is to say, for the purpose of flash photography, there were used, either jointly with a photoconductive cell or for selectively interchangeable connection with the photoconductive cell, an element such as silicon solar cell or a selenium photocell (these latter two will hereinafter to be referred to simply as photocells) which is able to respond more quickly than does the aforesaid photoconductive cell. It is to be noted, however, that the spectral sensitivity of the silicon solar cell is such that it shows its peak when subjected to light rays having a wavelength longer than that at which the visibility of a human being shows the peak. Accordingly, it may be said that the silicon solar cell serving as a factor assigned to detect the intensity of illumination of the scene fails to catch the light in an amount perfectly suitable for proper photography. On the other hand, the selenium photocell does not stand the use of an extended period of time. What may be said in common to both of them are the fact that they are expensive, that they show poor characteristics when subjected to low intensity of illumination and that their sensitivity to illumination of low intensity is markedly poor relative to the sensitivity to illumination of high intensity. Also, when a photoconductive cell is compared with a photocell, there is noted a basic difference in their actions such that the former shows variation in its resistance to the changes in the intensity of illumination to which it is subjected, whereas the latter shows variation in its electromotive force. Accordingly, when these elements are to be connected to said control circuits respectively, their connections will have to be effected in manners which are different from each other.

Photographic usage in general is such that the frequency of photography which is performed without the use of a flash bulb is very much greater than the frequency of photography in which the flash bulb is used. For this reason, cameras equipped with an electronic shutter adapted to be controlled by an electronic automatic exposure control circuit usually employ photoconductive cells such as CdS as the element for detecting the intensity of the illumination of the scene to be photographed. Therefore, it is desirable that such a camera be used also in flash photography and that proper exposure control be effected when a flash photograph is taken. However, as stated above, proper exposure control will not be attained by a mere joint use of the aforesaid photocell and said photoconductive cell or by a mere selective interchangeable connection between these two types of cells. In such cases, a specific consideration will be required for the construction of the circuit, as stated above. In addition, in order that a photoconductive cell for ordinary photography and a photocell for flash photography may be both attached to a single camera, there will be required a plurality of light-receiving windows for each of these elements; or, alternatively, in case these two elements are to be dealt with through a single window, there will be the necessity for the provision of a switch-over mechanism for causing the required one of the two elements to be positioned within the window in accordance with the mode of the photography.

Such arrangements are disadvangeous in that the camera mechanism becomes substantially complicated and that the manufacture thereof will involve an increase in the cost.

The present invention contemplates the solution of the foregoing problems.

SUMMARY OF THE INVENTION

It is, therefore, the primary object of the present invention to provide a simplified and compact flash photographic device which insures that a camera equipped with an electronic shutter adapted to be controlled by an electronic automatic exposure control circuit carries out proper exposure control in flash photography also.

Another object of the present invention is to provide a flash photographic device which is contained in an electronic automatic exposure control circuit adapted to control the electronic shutter of a camera and is operative in such a way that, prior to taking a flash photograph, the photoconductive cell for detecting the intensity of illumination of the scene to be photographed is preliminarily subjected to an irradiation of light from an illuminant and thereafter the lighting of the flash bulb is carried out so that the photoconductive cell is exposed to the light reflected from the scene which is illuminated by the flash of light from the luminescing flash bulb.

Still another object of the present invention is to provide a flash photographic device having the arrangement that an illuminant connected to a flash lighting circuit is provided at a position opposite the photoconductive cell in which this illuminant does not hamper the photoconductive cell in the latter's receiving the light reflected from the scene and operative in such a way that the illuminant will luminesce in the initial stage of the release of shutter mechanism of the camera to thereby irradiate the photoconductive cell and that, thereafter, the irradiation is suspended and the flash bulb is lighted up.

Yet another object of the present invention is to provide a flash photographic device equipped with an illuminant for use in effecting a preliminary irradiation of light and capable of compensating for the time lag between the moment of time at which the electromagnet of the electronic shutter is given a signal and the moment of time at which the shutter blades begin to close the exposure aperture, by virtue of the delay in time — due to the decay time characteristic of the photoconductive cell — resulting from the preliminary irradiation of light applied onto the photoconductive cell.

The foregoing and other objects as well as the characteristic features of the present invention will become more apparent and more readily understandable by reading the following description and the appended claims when taken in conjunction with the accompanying drawings.

DESCRIPTION OF THE PREFERRED EMBODIMENTS

Figure 1:
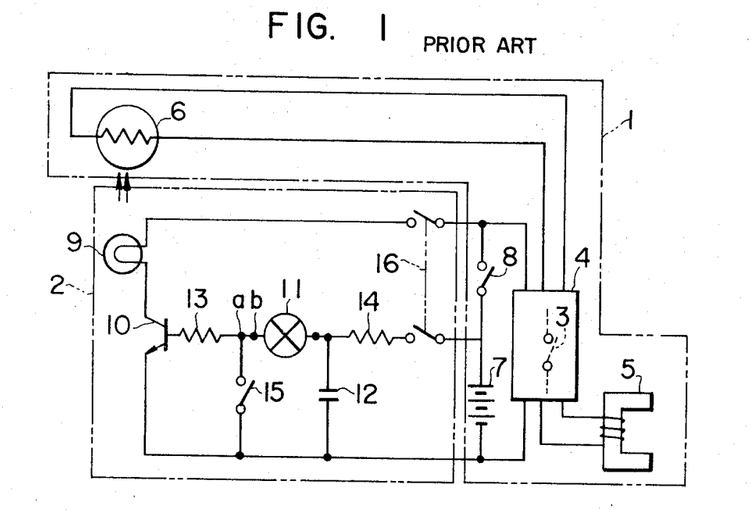
FIG. 1 is a schematic circuit diagram of the device according to one embodiment of the present invention.

Referring first to FIG. 1, there is shown the manner in which an electronic automatic exposure control circuit 1 of the prior art capable of controlling the electronic shutter is coupled to a control circuit 2 of the flash photographic device. Said control circuit 1 comprises a control block 4 containing a switch 3 for actuating the control circuit 1, an electromagnet 5 and a photoconductive cell 6, both of these latter two being connected to said control block 4. A power source battery 7 is connected to the control block 4 via a switch 8. On the other hand, the control circuit 2 comprises an incandescent lamp 9 which is provided opposite to said photoconductive cell 6 at a position in which this lamp 9 does not hamper the photoconductive cell 6 to receive the light reflected from the scene to be photographed, a transistor 10 for controlling the lighting up and putting out of this incandescent lamp 9, a flash bulb 11 and a series of members, i.e., a capacitor 12 for supplying a current to light up the flash bulb 11, resistors 13 and 14, a switch 15 and an interlocking switch 16. The switch 15 which is normally open is a so-called synchronized switch adapted to close interlockingly with the opening movement of the shutter blades (not shown). On the other hand, the interlocking switch 16, which is normally open is adapted to be closed — at the time the flash photographic device is used — in such a way that, in case said device is built within the camera, said interlocking switch 16 is closed upon attachment of a flash bulb 11 to the device, or that, in case said device is not built within the camera, said interlocking switch 16 is closed by means of a switch-over mechanism which is provided in the device and which is manually operated, or that it is closed by the attachment of a flash cord between the camera and the device.

Figure 2:
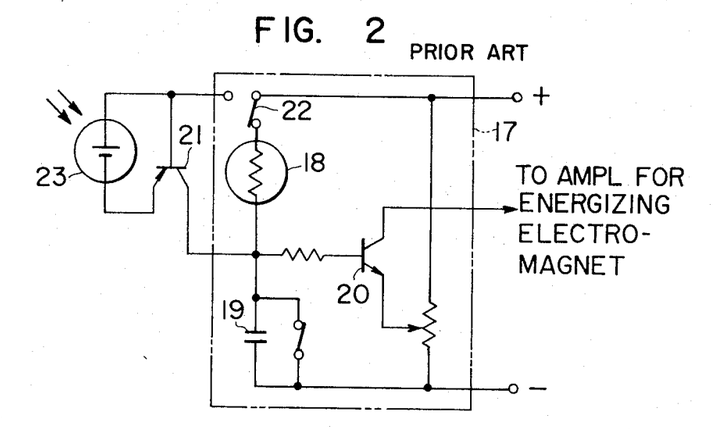
FIG. 2 is a circuit diagram of the light-receiving section in conventional device of this kind.

Referring now to FIG. 2, there is shown the relationship between a time delay control block 17 of the conventional circuit for controlling the electronic shutter and a light-receiving section intended for the flash photographic device. The time delay is determined by a photoconductive cell 18 and a capacitor 19. A transistor 20 is adapted to be actuated at the end of the aforesaid time delay, and thus the supply of a current to the electromagnet (not shown) is controlled. Upon the switch-over of a switch 22, the connection of the photoconductive cell 18 is relieved and, instead, the base and the collector electrodes of a transistor 21 are connected to each other. A photocell 23 is connected between the base and the emitter electrodes of the transistor 21.

Figure 3:
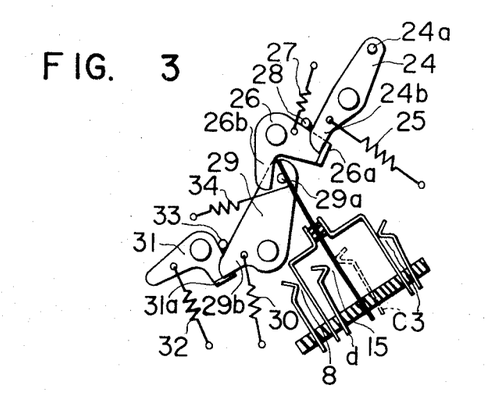
FIG. 3 is a somewhat diagrammatic representation of switch members corresponding to the switch means in the circuit shown in the respective drawings and also of a part of the shutter mechanism associated with these members.

Referring to FIG. 3, there is shown a part of the shutter mechanism in cocked position and the association between this part and the respective switches shown in FIG. 1 and FIGS. 5 through 8. A shutter blade driving member 24 is caused to rotate counter-clockwise by means of a spring 25. A pin 24a which extends upright from one of the arms of said driving member 24 is received in a slot provided in the shutter blades of the two blades type (not shown). Said pin 24a is adapted to open the shutter blades as said driving member 24 makes a counter-clockwise rotation. A locking member 26 is of two arms one of which is provided with a bent portion 26a formed integrally therewith. This locking member 26 is caused to rotate counter-clockwise by means of a spring 27. The counter-clockwise rotation of the driving member 24 is arrested by the engagement of said bent portion 26a with the other arm 24b of the driving member 24. A stopper 28 limits the counter-clockwise rotation of the locking member 26. A lock-releasing member 29 is caused to rotate counter-clockwise by means of a spring 30. A pin 29a extends upright from the lock-releasing member 29. This lock-releasing member 29 is also provided with a hook portion 29b which is formed integrally therewith. Said pin 29a pushes the other arm 26b of the locking member 26 as said lock-releasing member 29 makes a counter-clockwise rotation. As a result, the locking member 26 is caused to make a clockwise rotation against the action of the spring 27. This clockwise rotation of the locking member 26 relieves the engagement between the bent portion 26a of the locking member 26 and the other arm 24b of the driving member 24. A releasing member 31 is urged to rotate counter-clockwise by means of a spring 32 and it is provided with two arms, one of which is provided with a bent portion 31a formed integrally therewith. This bent portion 31a is in engagement with the hook portion 29b of the lock-releasing member 29 to inhibit the clockwise rotation of this latter member 29. A stpper 33 limits the counter-clockwise rotation of the releasing member 31. Switches 3, 8 and 15 correspond to the switches indicated by like reference numerals given in the circuit diagram shown in FIG. 1. This group of switches is actuated in accordance with the movement of the lock-releasing member 29. As the lock-releasing member 29 is rotated counter-clockwise, the position of the pin 29a relative to the group of switches changes accordingly. Along with the successive changes in the position of the pin 29a, the tension of the spring 34 will first cause the power source switch 8 to be closed, and then the switch 3 for starting the actuation of the control circuit 1 is opened. Simultaneously therewith, the switch 15 for lighting up the flash bulb is closed. In practice, however, an additional switch is connected in series to the power source switch 8. This additional switch (not shown) is associated with a closing member (not shown) of the shutter mechanism. This additional switch is closed by cocking the shutter. this switch will be caused to open upon the subsequent closure of the shutter following the opening of the latter which is carried out by the release of the shutter mechanism of the camera.

Figure 4A:
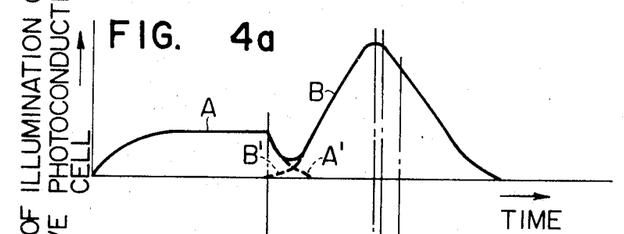
FIGS. 4a through 4e are characteristic curve diagrams showing the variation of factors in each of the sections of the device of the invention.
Figure 4B:
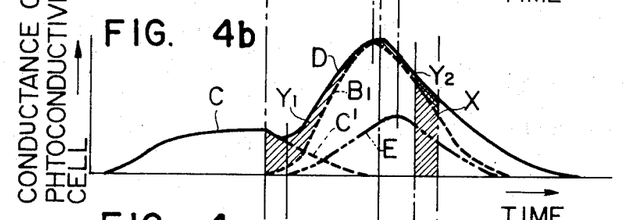
Figure 4C:
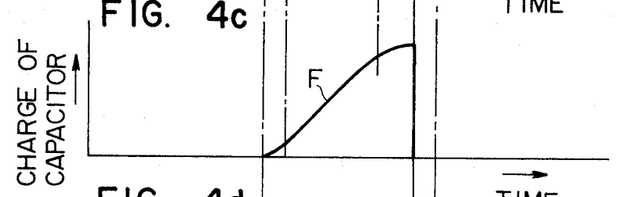
Figure 4D:
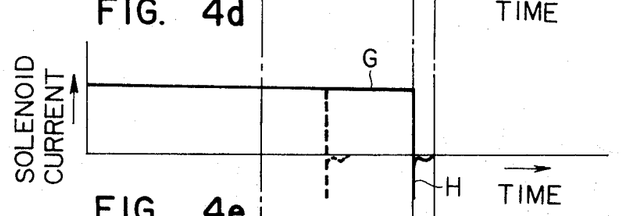
Figure 4E:
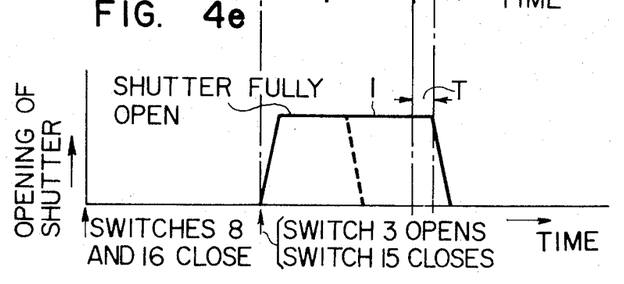

In the respective drawings, i.e., FIG. 4a through FIG. 4e, there are shown several sections of the exposure control circuit 1 in association with one of the sections of the shutter mechanism. 4a shows the variation, with respect to the changes in time length, of the intensity of the incident illumination received at the light-receiving face of the photoconductive cell 6. The portion A of the solid curve represents the curve indicating the changes in the intensity of incident illumination received at the light-receiving face of the photoconductive cell 6 — resulting from the preliminary irradiation of light from the incandescent lamp 9. The portion B of the solid curve represents the curve indication the changes in the intensity of incident illumination received at the light-receiving face of the photoconductive cell 6 — resulting from the incident light reflected from the scene upon the lighting up of the flash bulb 11. The portion A' of the dotted line represents the decay time curve portion of the photoconductive cell 6 resulting from the residual light emanating from the incandescent lamp 9. The portion B' of the dotted curve represents the buildup curve portion of the photoconductive cell 6 resulting from the reflected light at the very time when the flash bulb 11 begins to luminesce. FIG. 4b shows the changes in the conductance of the photoconductive cell 6 corresponding to the changes in the intensity of the incident illumination received at the light-receiving face of the photoconductive cell 6. The portion C and the portion D of the solid curve represent the changes in the conductance of the photoconductive cell 6 which correspond to the changes in the intensity of the incident illumination indicated by the portion A and the portion B in FIG. 4a. However, the changes in the conductance are relatively delayed in term of time when compared with the changes in the intensity of illumination. The portion C' of the dotted curve represents the decay time curve portion of the photoconductive cell 6 indicating the delayed changes in the conductance of said cell 6 in case the photoconductive cell 6 is subjected to only the irradiation of the preliminary light, said portion of decay time curve corresponding to the portion A' in FIG. 4a. The curve E consisting of two-dot chain line represents the changes in the conductance of the photoconductive cell 6 resulting from the luminescence of the flash bulb 11 in case the photoconductive cell 6 has not been subjected to the preliminary irradiation of the light from the illuminant. It will be noted that the curve E shows a marked delay in the build-up characteristic as compared with the curve D and that the level of the build-up of the former is much lower than that of the latter. It will be understood also that there is a considerable difference in the length of time until the peak is gained in the curve $B_1$ which indicates the changes in the conductance of the photoconductive cell having an ideal response characteristic such that no time delay in its response occurs for the changes in the intensity of illumination at the light-receiving face of the photoconductive cell 6 subjected to only the light from the flash bulb, and in the curve E which indicates the changes in the conductance of the photoconductive cell 6 where the latter has not been subjected to the irradiation of the preliminary irradiation of light from the illuminant. In case, therefor, there is used a camera which is arranged so that only the electronic automatic exposure control circuit 1 is actuated to serve as the exposure control element at the time of taking a flash photograph, the resulting photograph will represent an over-exposure photograph for the foregoing reason and as stated previously, or there may occur the undesirable inconvenience that the shutter blades are held open continuously for an extended period of time. FIG. 4c shows the manner in which the current is applied to the capacitor intended for controlling the delay time corresponding to the changes in the conductance of the photoconductive cell 6 shown in FIG. 4b, upon the starting of actuation of the electronic automatic exposure control circuit 1. The rate of the changes of the change curve F will vary with the condition of the changes in the curve D indicating the changes in the conductance which is shown in FIG. 4b. FIG. 4d shows the manner in which the electromagnet 5 connected to the output terminals of the electronic automatic exposure control circuit 1 is actuated. The change curve G represents the curve of the varying current applied to the energizing coil of the aforesaid electromagnet 5. The curve portion indicated by H represents the changes of the current by the counter-electromotive force which is generated in said coil of the electromagnet 5 when the aforesaid application of current has been suspended. This electromagnet 5 causes the closing movement of the shutter blades. The change curve G shows the relation of a series of sequential behaviors such that a current is applied to the electromagnet 5 by the closure of the power source switch 8 of the control circuit 1 and thereafter, as shown by the curve F in FIG. 4c, a current is applied to the capacitor intended for controlling the delay time and that, when the voltage of this applied current has reached the predetermined value, the supply of the current which has till then been applied to the electromagnet 5 is suspended owing to the action of the control section 4. FIG. 4e shows the manner in which the shutter blades (not shown) whose opening is adapted to be controlled mechanically and whose closing is controlled by the action of the electromagnet 5 are opened and closed. The opening and closing curve I of the exposure aperture of the shutter indicates the time lag T present between the moment of time at which the electromagnet stops its action and the moment of time at which said exposure aperture starts its closing action.

Next, consideration will be made on the actions of the component members. First, in case there is used a circuit of a conventional device of this kind shown in FIG. 2 where the arrangement is such that, in place of a photoconductive cell 18, a photocell 23 is connected to a time delay control block 17 by the manipulation of a change-over switch 22, it is necessary in practice that, as shown in the drawings, a combination of a photocell 23 and a transistor 21 (not the photocell 23 along) be connected to the control block 17 in such a manner as to be selectively switched over from one to the other. Also, as shown in the drawings, the transistor 20 which is controlled of its switching time by the time constant circuit formed by a photoconductive cell 18 and a capacitor 19 is connected in such a way that its emitter bias point may be varied by a potentiometer, and this potentiometer is utilized usually for purposes such as the setting of sensitivity of the film to be used. In case, however, there is connected to such a circuit, for the purpose of flash photography — in place of a photoconductive cell 18 — a photocell 23 whose electromotive force varies with the intensity of the incident light, there will arise the inconvenience that the emitter bias voltage of the photocell 23 will undergo a change whenever there occurs a change in the electromotive force. For this reason, it is not appropriate to use such a photocell 23 for the purpose of flash photography.

As stated above, the conventional circuit for flash photography has many defects including the aforesaid inconveniences. The present invention provides a flash photographic device which is completely free of the foregoing defects and inconveniences. The details of the outstanding features of the device of the present invention will become apparent by referring to FIGS. 1, 3 and FIGS. 4a through 4e.

In case a flash photographic device is built within the camera, it will be noted that, prior to performing a flash photography, the mounting of a flash bulb 11 to the camera will result in the closure of the interlocking switch 16. In case the said device is not built within the camera, the change-over mechanism (not shown) which is provided in the flash photographic device is manipulated for selective switch-over operation or, alternatively, a flash cord is attached between the camera and said device; by resorting to either one of these two operations, the interlocking switch 16 is closed as will be understood by referring to FIG. 1. Whereupon, the battery 7 is connected to the capacitor 12 and thus a current is applied to the latter 12. Thereafter, upon the depression of the release button of the camera to actually take a photograph, the releasing member 31 is rotated clockwise against the tension of the spring 32 resulting in the relief of the engagement between the bent portion 31a of the releasing member 31 and the hook portion 29b of the lock-releasing member 29 as will be understood by referring to FIG. 3. Accordingly, the lock-releasing member 29 is rotated counter-clockwise by the action of the spring 30. Along with this, the pin 29a of the lock-releasing member 29 undergoes a change in its position. As a result, the power source switch 8 is closed as the first step in a series of sequential actions of the component members, and thus, the electronic automatic exposure control circuit 1 is rendered to its first operative condition. Whereby, a current is applied to the energizing coil of the electromagnet 5 and the member (not shown) for arresting the closing movement of the shutter blades (not shown) is attracted to the electromagnet 5 and is held thereto. At the same time, the transistor 10 is rendered to its "on" state, causing the incandescent lamp 9 to be lighted up. The photoconductive cell 6 is, therefore, subjected to the preliminary irradiation of the light rays emanating from this incandescent lamp 9. Thereafter, as the pin 29a makes a further change in its position, the switch 3 is opened, and at the same time the switch 15 is closed. Also simultaneously therewith, the pin 29a pushes the arm 26b of the locking member 26, so that the locking member 26 is forced to make a clockwise rotation because the spring 30 is designed so as to have a tension greater than that of the spring 27. As a result, the bent portion 26a of the locking member 26 is relieved of its engagement with the arm 24b of the driving member 24, and accordingly, the driving member 24 is rotated counter-clockwise by the action of the spring 25. Whereupon, the pin 24a of the driving member 24 forces the shutter blades (not shown) to open. On the other hand, as the result of the closure of the switch 15, the base electrode of the transistor 10 will be brought to a potential same as that of the emitter thereof, and therefore, the transistor 10 is rendered to the "cut-off" state, and the incandescent lamp 9 will cease candescence. On the other hand, the capacitor 12 forms a closed circuit together with the flash bulb 11. Therefore, the capacitor 12 which has till then been charged is discharged though the flash bulb 11, and thus the flash bulb 11 luminesces.

On the other hand, owing to the opening of the aforesaid switch 3, the control circuit 1 is rendered to the second operative condition, i.e., the state in which this circuit 1 is measuring the intensity of illumination of the scene to be photographed. At such time, the photoconductive cell 6 of the aforesaid circuit 1 has been activated by being subjected preliminarily to the irradiation of light emanating from the incandescent lamp 9 as described previously, and therefore, the photoconductive cell 6 will effect response almost without any appreciable delay to the light rays reflected from the scene upon its being irradiated by the light of the flash bulb 11. Thereafter, when the amount of light received by the photoconductive cell 6 has reached the predetermined value, the electromagnet 5 is deprived of its attracting force, and with this, the aforesaid member for arresting the closing movement of the shutter blades will be released, and the shutter blades are thus closed.

On the other hand, as will be noted from FIGS. 4d and 4e, there exists a time lay T between the moment of time at which the application of the current to the energizing coil of the electromagnet 5 is interrupted and the moment of time at which the shutter blades actually starts their closing action adapted to be performed through the aforesaid member which is assigned for arresting the closing movement of the shutter blades and which actuated by the action of the electromagnet 5. This phenomenon of time lag is presumed to be caused, in one way, by the effect of the counter electromotive force generated in the electromagnet 5 and, in another way, by the loss occurring in the mechanical movement of the portion of the mechanism from the time said arresting member has been released till the time the opening which is formed by the shutter blades gains the dimension same as the exposure aperture. For the foregoing reasons, the moment of time at which the application of the current to the energizing coil of the electromagnet 5 is interrupted is determined, by taking into account the aforesaid time lag, so that appropriate exposures may be obtained. This will be understood better by referring to FIG. 4b. In the drawing, the region X indicated by the oblique lines slanted down toward the left represents the amount of integration of the changes occurring in the value of conductance of the photoconductive cell 6. This amount corresponds to the time lag between the moment of time at which a closing signal was dispatched to the shutter and the moment of time at which the exposure aperture actually begins to be closed by the shutter blades. Also, the region Y including the areas $Y_1$ and $Y_2$ indicated by the oblique lines slanted down toward the right in the drawing represents the amount of integration of the portions of difference between the changes in the conductance value of the photoconductive cell subjected to only the flash of light from the flash bulb in which said photoconductive cell is of an ideal speed of response without any time delay at all, and the changes in the conductance value of the same photoconductive cell resulting from a delay in the speed of response of the photoconductive cell 6 which occurs in case the latter has been preliminarily subjected to the irradiation of light from the incandescent lamp 9 and then to the flash of light from the flash bulb 11. In other words, in order to obtain proper amounts of exposure in flash photography, the region X and the region Y are arranged so that these two have the same size relative to each other. The aforesaid statement represents an instance in which the moment of time at which a proper amount of exposure is obtained in a flash photography is set on the decay time characteristic side of the luminescence curve of the flash bulb 11. However, even in case the moment of time at which the proper amount of exposure is obtained is found on the build-up side of the aforesaid luminescence curve as indicated by dotted lines in FIGS. 4d and 4e, a correct setting will be insured if the aforesaid moment of time is set in the same manner as described in connection with the above instance. In the above-described embodiment, the moment of time at which the electronic automatic exposure control circuit 1 begins to be actuated is set exactly at the same moment of time at which the flash bulb 11 luminesces. In contrast to this, in FIG. 5, there is shown only the control circuit section incorporated in the flash photographic device in another embodiment in which the moment of time of the former is set so as to be delayed relative to the moment of time of the latter.

Figure 5:
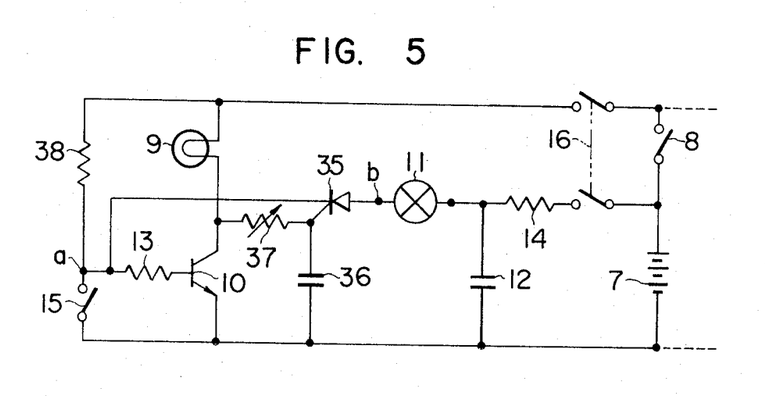
FIGS. 5, 6, 7 and 8 are fragmentary circuit diagrams of some other embodiments of the present invention.

The difference between the control circuit 2 shown in FIG. 1 and the control circuit in this another embodiment lies in the fact, in this latter circuit, there is connected thereto a SCR 35 between the connecting point a which is located between the switch 15 and the resistor 13 in FIG. 1 and a terminal point b of the flash bulb 11 in such a way that the cathode of SCR 35 is connected to the connecting point a and that the anode thereof is connected to the terminal point b. Also, the gate thereof is connected to the negative feeder of the battery 7 through a capacitor 36 and at the same time the gate is connected to the collector of the transistor 10 via a variable resistor 37. Furthermore, the connecting point a is connected to the positive feeder of the battery 7 through a resistor 38. When it is intended to perform a flash photography in this embodiment, the first step of operation is that the interlocking switch 16 is closed as in the case of the first embodiment. Thereafter, at the time the photography is actually conducted, the shutter release of the camera will be preformed which will lead first to the closure of the power source switch 8. As a result, the incandescent lamp 9 will be lighted up. Then, upon opening of the switch 3 intended for starting the actuation of the aforesaid control circuit 1, the switch 15 will be closed simultaneously. Whereupon, the incandescent lamp 9 will be turned off. Throughout the period in which the incandescent lamp 9 continues to be lighted up, or in other words, prior to the switch 15 being closed, SCR 35 is in the condition in which the cathode potential of the same is higher than the gate potential. Therefore, SCR 35 is in the "cut-off" state. Even when the switch 15 is closed and the transistor 10 rendered to the "cut-off" state, the gate potential, during the period immediately after that, has not yet been elevated much, and SCR 35 is left continuously in its "cut-off" state. Thereafter, when the capacitor 36 is charged through the incandescent lamp 9 and the variable resistor 37 and when the potential of this capacitor thus reaches a certain level, SCR 35 is rendered to the "on" state. At such time, the flash bulb 11 will luminesce as the capacitor 12 discharges. In this part of operation, the interval of time between the moment of time at which the switch 15 is closed and the moment of time at which SCR 35 is rendered to "on" state is determined by the time constant which, in turn, is determined by the respective resistance values of the incandescent lamp 9 and the variable resistor 37 and by the value of the capacity of the capacitor 36. This time constant may be regulated easily by regulating the resistance value of the variable resistor 37. This means that there has been provided a means by which the amounts X and Y of integration of the charges in the conductance value of the aforesaid photoconductive cell 6 can be easily brought into agreement with each other.

Figure 6:
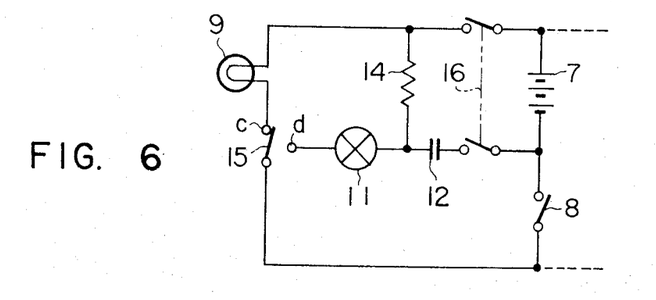

Furthermore, in FIG. 6, there is shown only the control circuit section of the flash photographic device in still another embodiment in which the aforesaid interval of time is adapted to be determined and set mechanically. In this instant embodiment, the switch 15 is adapted to close, by selective change-over manipulation, either the circuit for the incandescent lamp 9 or the circuit for the flash bulb 11. In this embodiment, the interval of time in which the switch 15 is changed-over from the terminal C (which is indicated by broken lines in FIG. 3) to the terminal $d$ in FIG. 6 corresponds to the interval of time described above in connection with the preceding embodiment. The action of this switch 15 will hereunder be considered in connection with the actual mechanism by referring to FIG. 3. When the pin 29a effects a change in its position as the lock-releasing member 29 is rotated counter-clockwise, this change in position of the pin 29a will first cause the switch 3 assigned for starting the actuation of the control circuit to be opened. Along with this, the contact between the fixed contact strip indicated by broken lines (which is shown by the terminal C in FIG. 3) and the movable contact strip in the switch 15 is relieved. Thereafter, at the end of a certain interval of time, the movable contact strip is brought into contact with another fixed contact strip indicated in solid lines (which is shown by the terminal $d$ in FIG. 3). The interval of time from the moment of time at which the movable contact strip is relieved of its contact with one of the fixed contact strips to the moment of time at which this movable contact strip is brought into contact with the other of the fixed contact strips may be adjustable provided that, for example, the position of the latter fixed contact strip is arranged so as to be adjustable. Also, in FIG. 7, there is shown a further embodiment wherein the moment of time at which the incandescent lamp 9 is put out is set so as to be delayed than not only the moment of time at which the electronic automatic exposure control circuit 1 begins to be actuated but also the moment of the time at which the flash bulb 11 is lighted up, and wherein this delay time can be adjusted. In this instant embodiment, a transistor 39, a capacitor 40 and a variable resistor 41 are additionally connected to the above-described circuit elements. In case a flash photography is to be conducted by the use of a camera equipped with this flash photographic device, the interlocking switch 16 is closed first. Thereafter, in the actual action of photography, the power source switch 8 is closed first to light up the incandescent lamp 9. Then, at the end of a certain length of time, the switch 3 for starting the actuation of the control circuit 1 is opened, and along with this, the connection of the switch 15 is switched over from the terminal C on the incandescent lamp 9 side to the terminal $d$ on the flash bulb 11 side. As a result, the flash bulb 11 luminesces owing to the discharging action of the capacitor 12. The incandescent lamp 9, on the other hand, continues its candescence even when the connection thereto of the switch 15 is broken, because of the fact that the resistor 39 is in the "on" state for the period immediately after said disconnection of the switch 15. When, subsequently, the capacitor 40 is charged via the incandescent lamp 9 and a variable resistor 41, the base electrode potential of the transistor 39 is lowered to a level below the potential at which the same transistor can be actuated. Thus, the transistor 39 is rendered to the "cut-off" state and the incandescent lamp 9 is put out for the first time. In this part of operation, the length of time from the moment of time at which the connection of the switch 15 with the incandescent lamp 9 is broken till the moment of time at which the transistor 39 is rendered to the "cut-off" state may be adjustable by altering the value assumed by the variable resistor 41. The difference in the amounts of exposure due to such time lag as described above which is present between the moment of time at which a signal is applied to the electromagnet and the moment of time at which the exposure aperture actually begins to be closed, may be easily compensated for by the provision of the foregoing arrangement. It is to be noted that it is not desirable that the photoconductive cell 6 be subjected to an excessively intensive irradiation of light or to an irradiation lasting for an extended period of time while the intensity of illumination of the scene is being measured. The reason for this is that, during the period of such an excessive irradiation or during such a prolonged irradiation, those light rays which are in fact irrelevant to the illumination of the scene itself will also join, with a powerful harmful influence, in the factors which determine the amount of exposure. Therefore, it is necessary that the preliminary irradiation of light in such a photography be carried out under an appropriate condition.

Figure 8:
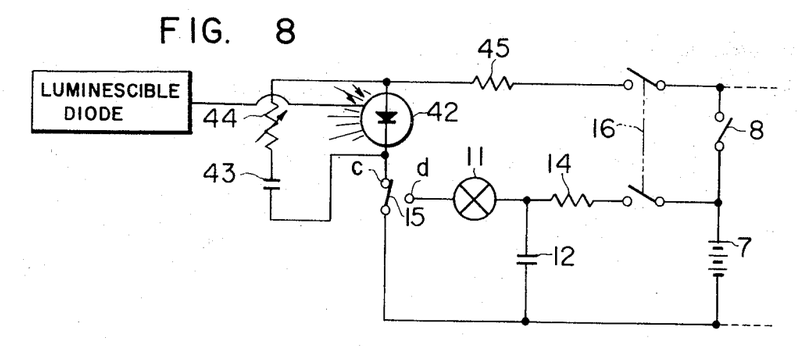

In FIG. 8, there is shown a still further embodiment in which a luminescible diode is used in place of an incandescent lamp. In this instance, a luminescible diode 42, a capacitor 43, a variable resistor 44 and a resistor 45 are additionally connected to the control circuit described above.

As the luminescible diode 42, there is used a Gap luminescible diode whose luminescence has the wavelength of 5800 A which lies within the range of visible spectrum. Luminescible diode indicators are well known to the art, as exemplified by U.S. Pat. No. 3,452,347 to A.G. Stimson.

Figure 7:
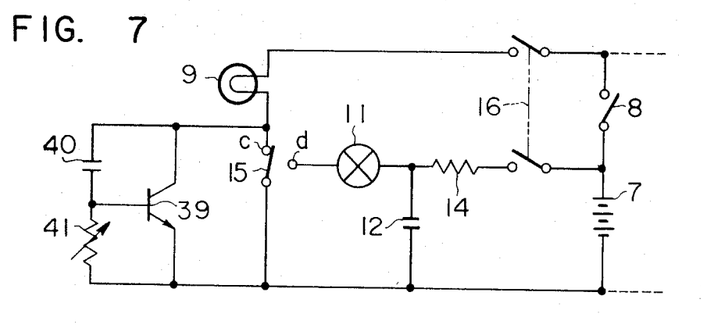

In carrying out a flash photography, a series of operations are performed in the same way as that described in connection with the embodiment shown in FIG. 7. The switch 15 is connected to the luminescible diode 42 side so that the change-over of the connection of the switch 15 will be effected starting from the luminescible diode 42 which is in the state of luminescing to the flash bulb 11, causing the flash bulb 11 to luminesce. It is to be noted, however, that even after the connection of the switch 15 to the luminescible diode 42 has been broken, the luminescible diode 42 continues to luminesce though reducing the amount of luminescence, throughout the period of time determined by the time constant which, in turn, is determined by the value assumed by the capacitor 43 and by the value assumed by the variable resistor 44. This duration of luminescence, i.e., the proportion of the reduction in the amount of luminescence of the luminescible diode 42, may be altered by regulating the value assumed by the variable resistor 44. Also, in a modified arrangement in which the luminescible diode 42 is used as the illuminant and the time constant circuit formed with the capacitor 43 and the variable resistor 44 is not connected thereto, the device will be operative in such a way that, upon the switch 15 being disconnected, the luminescible diode 42 will instantaneously stop luminescing without giving rise to any "after-glow" which would occur in case an incandescent lamp 9 is used.

Also, if, in each of the above-mentioned embodiments, the interlocking switch 16 is omitted to provide a direct connection in this part of the circuit, and if, instead of this interlocking switch 16, there is provided a switch for making and breaking one of the terminals of the flash bulb 11, the photoconductive cell 6 will be always subjected to preliminary irradiation of light even in ordinary photography. Accordingly, this arrangement will replace the method described above which is intended to regulate the moment of time at which the switch for starting the actuation of the circuit is opened as has been practiced in the past, and will enable one to easily compensate for the interval of time from the moment of time at which a signal is dispatched to the electromagnet 5 till the moment of time at which the exposure aperture of the shutter actually begins to be closed. It should be understood further that the aforesaid illuminant may, in principle, be such one as will cause the photoconductive cell to be activated in the same way as described above whenever the illuminant is actuated.

Of course, while the present invention has been described with respect to particular embodiments, variation can be resorted to without departing from the spirit of the invention or the scope of the subjoined claims.

We claim:

1. In a camera having an electrically controlable shutter, a flash photographic device comprising
    a power source;
    a photoconductive cell connected to said power source and capable of detecting the changes in the value of intensity of illumination of the scene to be photographed;
    a flash bulb connectable to said power source;
    an illuminant connectable to said power source and arranged to radiate on to said photoconductive cell; means to cause said illuminant to gradually decrease its luminescence when the current supplied to said illuminant is interrupted; and
    a change-over switch means connected between said power source and said illuminant with means for connecting said illuminant to said power source and irradiating said illuminant photo conductive all upon the initiation of the shutter release operation and
    for connecting said flash bulb to said power source at the time when the shutter is opened.

2. A flash photographic device according to claim 1, in which said illuminant is an incandescent lamp.

3. A flash photographic device according to claim 1, said change-over switch means comprising
    a transistor having the collector electrode connected to one terminal of said illuminant and the emitter electrode connected to one terminal of said power source,
    a fixed contact member connected to the juncture of the base electrode of said transistor and one terminal of said flash bulb, and
    a movable contact member connected to the emitter electrode of said transistor and contactable with said fixed contact member.

4. A flash photographic device according to claim 3, further comprising
    a silicon-controlled rectifier having the cathode electrode connected to the base electrode of said transistor and the anode electrode connected to said flash bulb;
    a variable resistor connected between the collector electrode of said transistor and the gate electrode of said silicon-controlled rectifier, and
    a capacitor connected between the gate electrode of said silicon-controlled rectifier and said power source.

5. A flash photographic device according to claim 1, said change-over switch means comprising:
    a first fixed contact member connected to one terminal of said illuminant;
    a second fixed contact member connected to one terminal of said flash bulb, and
    a movable contact member connected to one terminal of said power source with means of contact with said first and second fixed contact members.

6. A flash photographic device according to claim 1, further comprising:
    a transistor having the collector electrode connected to one terminal of said illuminant and the emitter electrode connected to one terminal of said power source;
    a capacitor connected between the collector electrode and the base electrode of said transistor, and
    a variable resistor connected between the base electrode and the emitter electrode of said transistor.

7. A flash photographic device according to claim 1, said change-over switch means comprising:
    a first fixed contact member connected to one terminal of said illuminant,
    a second fixed contact member connected to one terminal of said flash bulb, and
    a movable contact member with means for alternative contact with said first and second fixed contact members and connectable to one terminal of said power source.

8. A flash photographic device according to claim 1, in which said illuminant is a luminescible diode, said device further comprising a variable resistor and a capacitor connected in series with each other between the terminals of said luminescible diode.

* * * * *